United States Patent
Clark et al.

(10) Patent No.: US 7,831,662 B2
(45) Date of Patent: Nov. 9, 2010

(54) MULTI-USER DATABASE SYSTEM AND METHOD FOR RESOURCE USAGE TRACKING

(75) Inventors: Mary B. Clark, Florissnt, MO (US); Phillip E. Lancour, Racine, WI (US); Satwant Bal, Fremont, CA (US); Thomas F. Stanek, Crystal Lake, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/403,442

(22) Filed: Mar. 13, 2009

(65) Prior Publication Data
US 2009/0198773 A1    Aug. 6, 2009

Related U.S. Application Data

(63) Continuation of application No. 10/618,256, filed on Jul. 11, 2003, now Pat. No. 7,526,521.

(51) Int. Cl.
*G06F 15/16* (2006.01)

(52) U.S. Cl. ........................ 709/203; 709/227; 709/204; 709/202; 709/226; 709/248; 709/207; 709/205; 709/230; 455/433

(58) Field of Classification Search ................. 709/203, 709/202, 227, 204, 226, 248, 207, 205, 230
See application file for complete search history.

(56) References Cited

U.S. PATENT DOCUMENTS

| 7,526,521 B2 * | 4/2009 | Clark et al. ................. 709/203 |
| 2003/0073494 A1 * | 4/2003 | Kalpakian et al. ............. 463/42 |

* cited by examiner

*Primary Examiner*—Jude J Jean Gilles
(74) *Attorney, Agent, or Firm*—Toler Law Group

(57) ABSTRACT

The disclosure is directed to a database system. In a particular embodiment, a database system includes a first processor configured to receive transactions, including session maintenance transactions and data requests, from one or more users. The database system also includes a request table to store resource usage data associated with the data requests. The request table is accessible to identify particular data requests that utilize a selected level of computing resources.

12 Claims, 7 Drawing Sheets

SESSION TABLE

| USER ID | HOST ID | SESSION ID | LOGON DATE | LOGON TIME | LOGOFF DATE | LOGOFF TIME | LOGON PERFORMANCE GROUP | LOGOFF EVENT | SESSION DURATION | SESSION CPU | SESSION ID |
|---|---|---|---|---|---|---|---|---|---|---|---|
| | | | | | | | | | | | |
| | | | | | | | | | | | |
| | | | | | | | | | | | |
| | | | | | | | | | | | |

| MVS DATA | IP ADDRESS | PROCESS ID | ACCT NAME | LOAD DATE | LOAD TIME |
|---|---|---|---|---|---|
| | | | | | |
| | | | | | |
| | | | | | |
| | | | | | |

*FIG. 4*

REQUEST TABLE

| HOST ID | SESSION ID | USER ID | LOGON DATE | LOGON TIME | REQUEST START DATE | REQUEST START TIME | REQUEST PERFORMANCE GROUP | AMP COUNT | CPU | IO | PARALLELISM | RATIO | LOAD DATE | LOAD TIME |
|---|---|---|---|---|---|---|---|---|---|---|---|---|---|---|
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

*FIG. 5*

MULTI-USER DATABASE SYSTEM AND METHOD FOR RESOURCE USAGE TRACKING

CLAIM OF PRIORITY

The present application claims priority from and is a continuation of patent application Ser. No. 10/618,256, filed on Jul. 11, 2003 and entitled "Multi-User Database System and Method For Resource Usage Tracking," the contents of which are expressly incorporated herein by reference in their entirety.

FIELD OF THE DISCLOSURE

This disclosure is, in general, related to multi-user database systems and methods of resource usage tracking.

BACKGROUND

Large data warehouse systems are often used in decision and operational support systems. These large systems are typically accessible by multiple users through network interfaces or mainframe communications channels. Many such systems support parallel processing, and have multiple processors. Such processing capabilities permit many users to initiate sessions and request transactions with the data warehouse.

A problem can arise with typical enterprise data warehouse systems when inefficient or erroneous requests are submitted. Inefficient requests may utilize excessive amounts of central processing unit (CPU) time or input/output bandwidth. This excessive resource utilization may slow response times of the system or tax the resources available to other users. Erroneous queries compound the problem by utilizing CPU time while producing limited benefit to users. Typical enterprise data warehouses lack the ability to track and identify inefficient and erroneous transaction requests.

These typical enterprise data warehouse systems also lack the ability to track resource utilization based on particular user sessions and transaction requests. To forecast expected resource usage and to plan for resource allocation, it may be desirable to have an historical record of resource utilization associated with session and request usage. However, typical enterprise data warehouses lack the ability to track resource usage such as CPU time and input/output traffic for unique sessions or transaction requests. Therefore an improved enterprise data warehouse system would be desirable.

BRIEF DESCRIPTION OF THE DRAWINGS

FIGS. 4 and 5 depict exemplary data tables.

The use of the same reference symbols in different drawings indicates similar or identical items.

DETAILED DESCRIPTION

In a particular embodiment, a database system is disclosed and includes a first processor configured to receive transactions, including session maintenance transactions and data requests, from one or more users. The database system also includes a request table to store resource usage data associated with the data requests. The request table is accessible to identify particular data requests that utilize a selected level of computing resources.

In a particular embodiment, the database system also includes an event table to store an event log of the session maintenance transactions, an accounting table to store data associated with the data requests, and a session table derived from the event table and the accounting table. The session table is to store resource usage data associated with a user session that accesses the database system. The session table is accessible to determine a historical trend of data warehouse resource usage among the plurality of users.

In a particular embodiment, a method of tracking database system usage is disclosed. The method includes preparing a request table including one or more request table entries. Each request table entry includes corresponding resource usage data associated with a corresponding request transaction of a corresponding new session of the database system. The method also includes identifying a resource inefficient transaction request based on the resource usage data included in the request table and modifying the resource inefficient transaction request to enhance performance associated with the database system.

Figure 1:
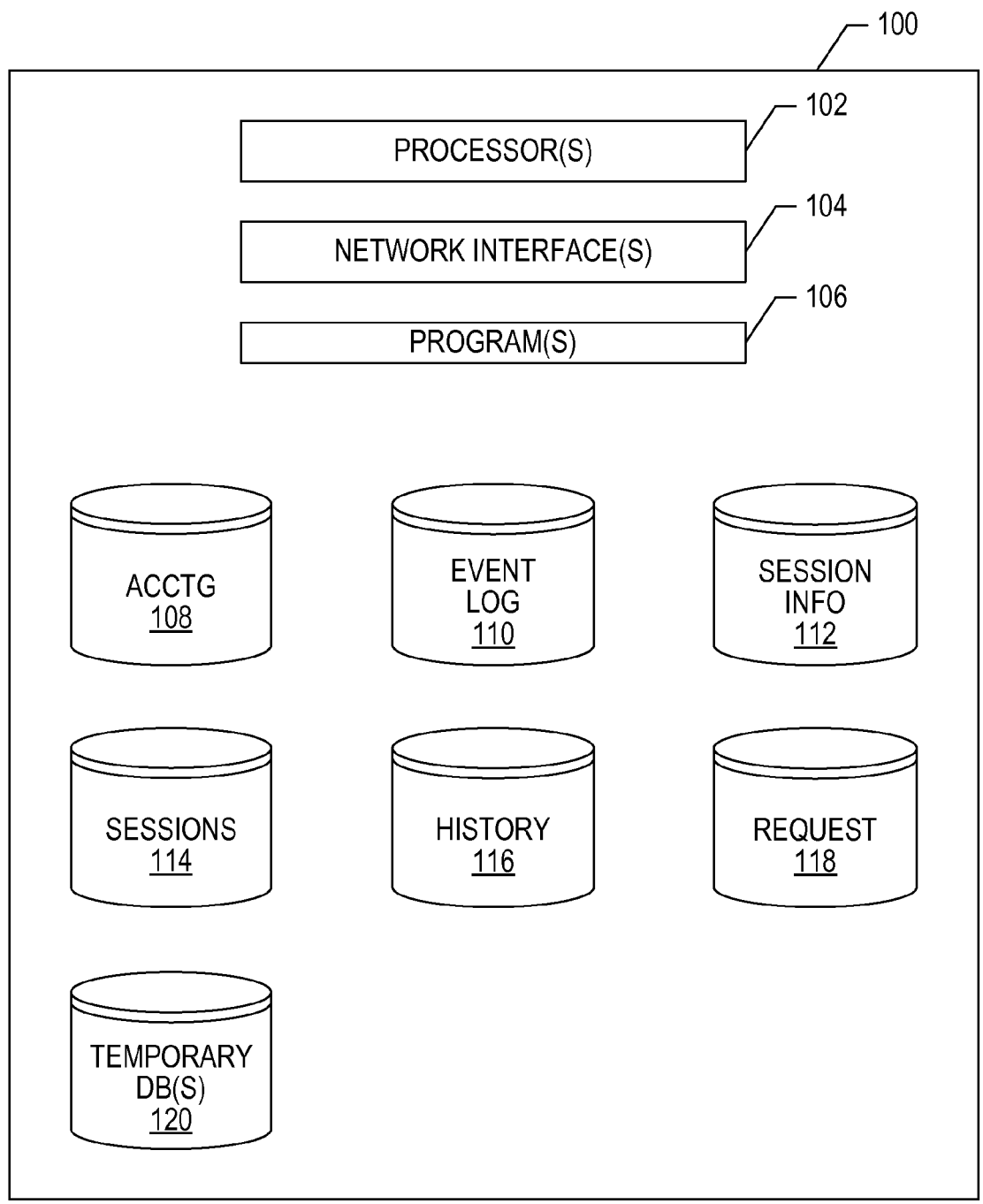
FIG. 1 depicts an exemplary embodiment of an enterprise data warehouse.

FIG. 1 depicts an exemplary embodiment of an enterprise data warehouse 100. The enterprise data warehouse 100 may have one or more processors 102, network interfaces 104, programs 106, an accounting database 108, an event log database 110, a session information database 112, a sessions database 114, a history database 116, a request database 118, and various temporary databases 120. A processor or multiple processors 102 may interpret and perform transactions with the various databases and tables. Multiple processors may allow parallel processing and faster performance.

Various network interfaces 104 may provide access from remote locations to the enterprise data warehouse. From remote locations users may log on to the enterprise data warehouse 100 and perform transactions. These transactions may include session maintenance transactions such as opening a session or closing a session and database/table queries and maintenance transactions. Enterprise data warehouse 100 may also include various programs such as database engines, scripts, utilities, operating system code, and executables.

The enterprise data warehouse may have various databases or data tables such as an accounting table 108, an event log 110, a session info table 112, a session table 114, a history table 116, a request table 118 and various temporary tables 120. A database may include one or more tables with various logical links. Databases or tables may be alternately organized as more than one table. The accounting table 108 may track central processing unit (CPU) usage and input/output (I/O) usage and associate these with an account name, a user name, an accounting string, or a request string. The CPU usage may, for example be expressed in processing time or clock units, among others. The I/O usage may, for example, be expressed as bit or byte counts, packet counts, or usage time, among others. The event log 110 may, for example, track session maintenance transactions such as log-on and log-off transactions. The event log 110 may associate log-on dates and times with user names and account names and assign session identification numbers. The session information table 112 may track running sessions and associate these with a user name, an account name, or a session identification number. In some cases, third party software may be used to capture query strings. Data may be extracted from the accounting table 108, event log table 110, and session info table 112 to provide a session table 114, a history table 116, and a request table 118.

The session table 114 may provide a cumulative accounting of resource usage attributed to various sessions. The session table 114 may include entries for storing statistical characteristics and cumulative usage of CPU and I/O usage, among others, associated with a given session. The request table 118 may hold entries that associate transaction requests with CPU and I/O usage statistics. The entries in the request table 118 may also be associated with user sessions.

The history table 116 may be used to indicate which transactions have been incorporated into the session table 114 and the request table 118. Periodically, the accounting table 108 may be purged. Between purges, the history table 116 may track transaction entries that have been processed into the session table 114 or the request table 118. In creating the session table 114 and the request table 118, various temporary databases 120 may be used.

In addition to the databases listed above, the enterprise data warehouse 100 may be used to store or access many other databases and tables. Furthermore, the enterprise data warehouse 100 may include various connections to other computational systems such as mainframes or other database systems. The enterprise data warehouse may also include software to capture query strings. One exemplary embodiment of the enterprise data warehouse 100 is a data warehouse by Teradata®.

Figure 2A:
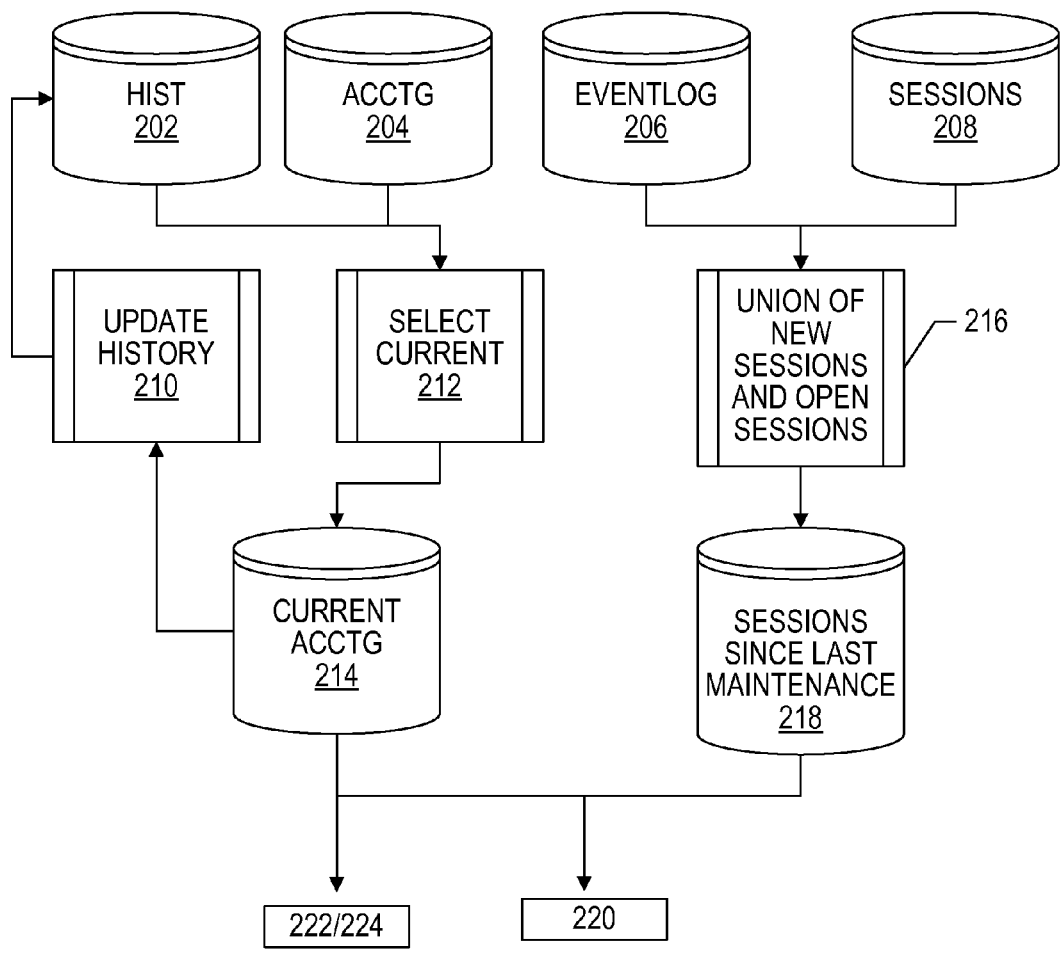
FIGS. 2-A, 2-B and 2-C depict an exemplary data flow.
Figure 2B:
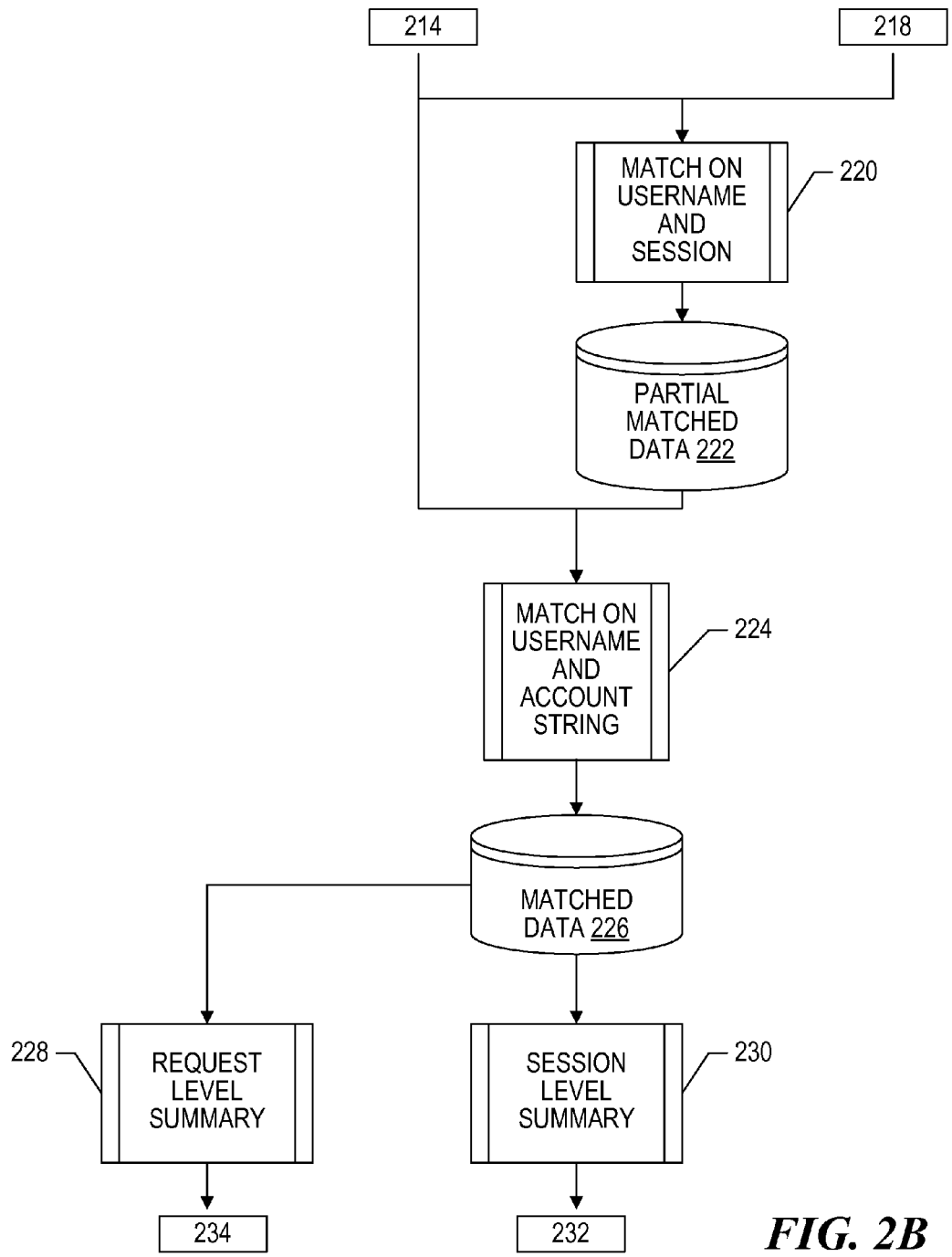
Figure 2C:
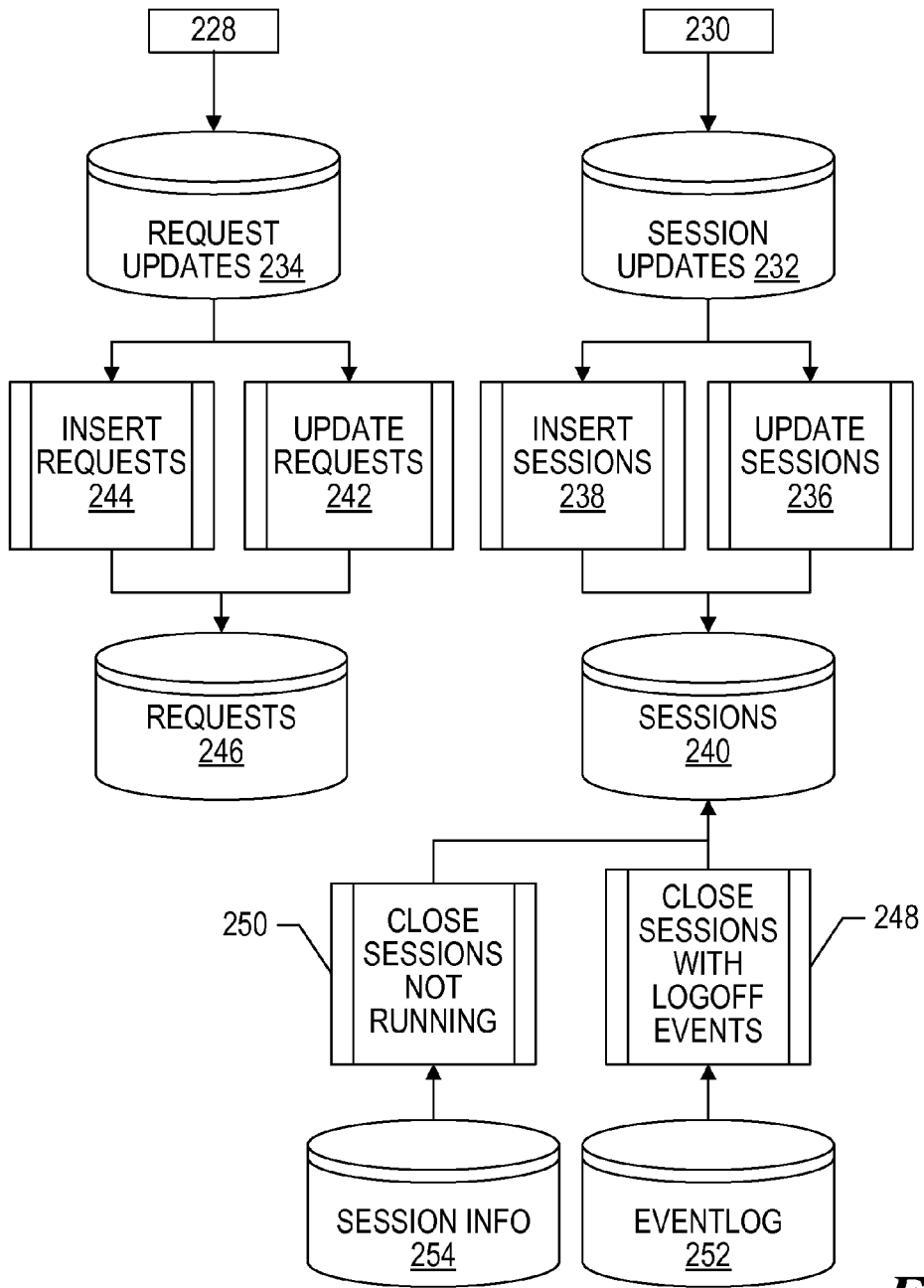

FIGS. 2-A, 2-B, and 2-C depict a data flow useful in accumulating information from an accounting table 204, an event log table 206, and a sessions information table 254 to create a session table 240 and a request table 246. As shown in FIG. 2-A, a history table 202 may be queried with the accounting table 204 to determine which entries in the accounting table 204 have not been previously processed. The history table 202 may include a listing of those entries within the accounting table 204 that have been previously processed. The accounting table 204 may be periodically purged. If the periodic purging occurs less frequently than the processing of the transaction data, the history table 202 provides a listing of those transactions in the accounting table 204 that had been previously processed. The history table 202 may be purged at the same time as the accounting table 204. The query is performed as shown in transaction 212 to select the current transactions and store them in the current transactions accounting table 214. Once the current accounting transactions table 214 has been used in the process below, the history table 202 may be updated with an update history transaction 210.

The session table 208 may be used in conjunction with the event log 206 to determine which sessions are new or open. As shown in transaction 216, the event log 206 is compared to the session table 208 to determine a set of session entries that occurred after the last processing or maintenance. These may be stored in a "sessions since last maintenance" table 218.

As shown in FIG. 2-B, the current accounting table 214 may be compared with the "sessions since last maintenance" table 218. The current accounting table 214 stores information associated with CPU and I/O usage. The "sessions since last maintenance" table 218 stores data associated with new and open sessions. As shown with transaction 220, the tables may be matched based on user name and session identification. This comparison may yield a partially matched data table 222. Some entries within the current accounting table may not include a session identification field. In some records within the current accounting table 214, the accounting string will include session identification. These records may be parsed to determine the session identification. A second request 224 may be performed using the user name and account string on the partially matched data to provide a matched data set 226 having more matched data. The matched data set 226 may store transaction resource usage entries associated with session or request data. The request level statistics and session level statistics may then be summarized with a request level summary transaction 228 and a sessions-level summary transaction 230.

As shown in FIG. 2-C, the sessions-level summary transaction 230 results in a session update data table 232, and the request-level summary transaction 228 results in a request updates table 234. The session update table 232 may include sessions that were open as of the last processing and have new data or new sessions that were started after the previous processing. An update sessions transaction 236 may update the data associated with open sessions, and a insert sessions transaction 238 may insert new entries associated with new sessions occurring since the previous processing. These transactions 236 and 238 may be performed on a session table 240. Similarly, the request updates data table 234 may include open requests having new data and new requests. The update request transaction 242 may update request or transaction data in the request database 246 and the insert request transaction 244 may update the request table 246 with new entries associated with new requests or transactions.

In one exemplary embodiment, the event log 252 may be queried through transaction 248 to determine which sessions have been closed with log-off events. The session info database 254 may also be queried with transaction 250 to determine if any sessions are not running and close those sessions in table 240.

The session table 240 and the session table 208 may take the same format and represent the same table at different points in the data flow. In one exemplary embodiment, the session table 240 and the session table 208 are snapshots of the same table at different points in time. Similarly, the event log 252 and the event log 206 may represent the same table at the same or different points in the data flow. In one exemplary embodiment, the event log 252 and the event log 206 are snapshots of the same table at different points in time.

Figure 3:
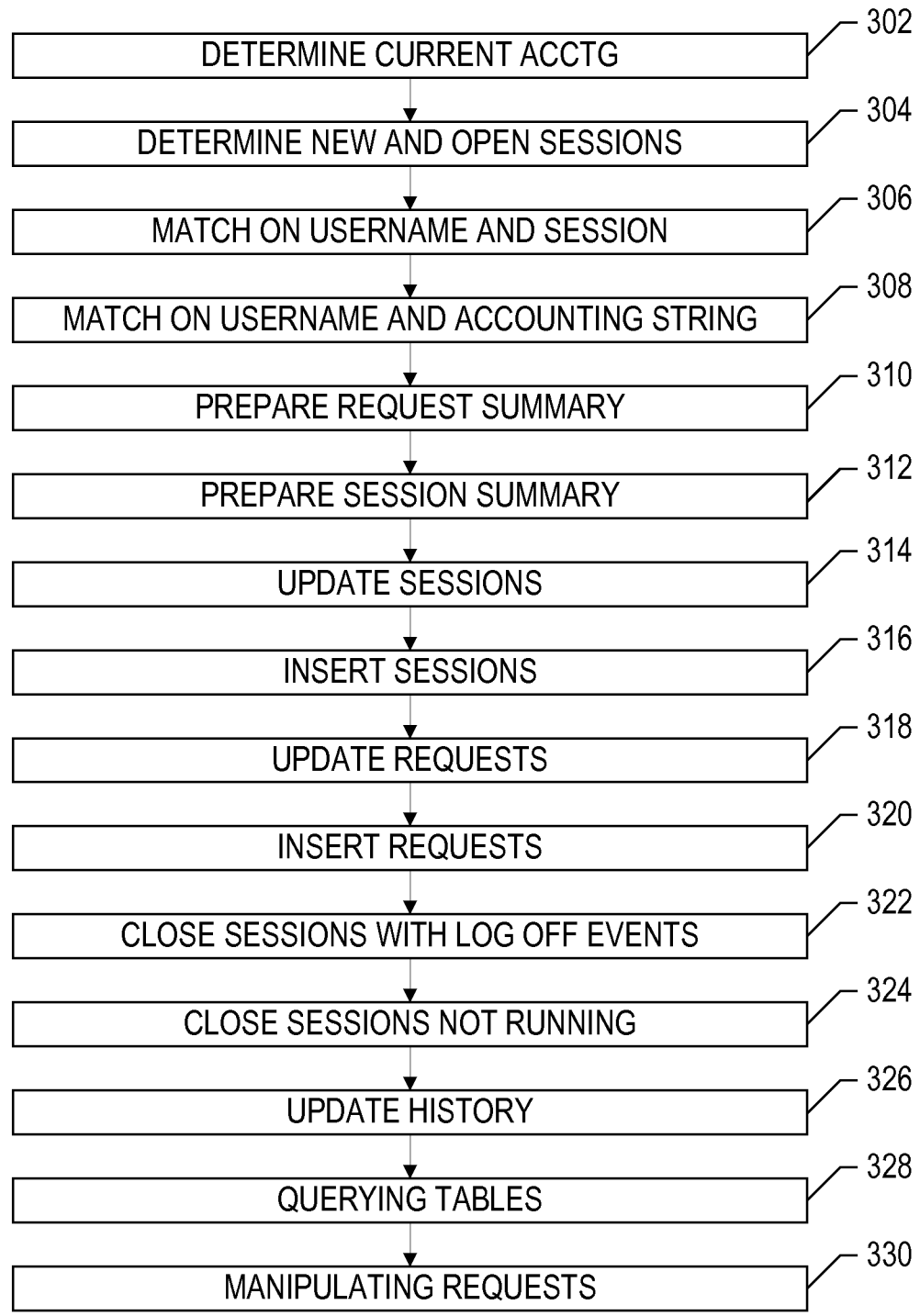
FIG. 3 illustrates an exemplary method for determining resource usage.

FIG. 3 depicts an exemplary method for creating the sessions and requests table data. Further, this method may be used to determine historical trends in CPU and I/O usage and may also be useful in determining which transactions cause problems or result in excessive CPU and I/O usage, thus, enabling improved data warehouse management. As shown in step 302, a current set of accounting transactions may be determined. The current set of accounting transactions may include transactions not previously processed. In one exemplary embodiment, the current set of transactions may be determined by comparing an accounting database with a history table. A set of new and open sessions may also be determined as shown in step 304. The set of new and open sessions may, for example, be determined by comparing a session table with an event log. These two steps, 302 and 304 may occur simultaneously, or in various orders.

With the set of current accounting transactions and a set of new and open sessions, the data from these two sets may be matched on the user name and session identification as seen in step 306. In systems where the session identification may not be recorded with all entries, a further match may be performed using the user name and account string, as shown in step 308. In alternate embodiments, various matches may be performed in various orders. With these matches, a data table may be prepared from which a request summary may be drawn as seen in step 310 and a sessions summary may be drawn as seen in step 312.

With the summaries, session tables and request tables may be updated or new entries may be added. As shown in step 314, the session table may be updated with sessions that were previously opened and have new data. As shown in step 316, new sessions that were opened since the previous processing may be inserted into the session table. Similarly, the request table may updated as shown in step 318 or new requests may be inserted in the request table as shown in step 320. These steps, 314, 316, 318, and 320 may be performed in various orders or simultaneously, depending upon the capabilities of the enterprise data warehouse system.

The session table may be further updated by closing sessions that exhibit log-off events as shown in step 322. Further, the session table may be updated by closing sessions that are not running, as indicated by a session information table, as shown in step 324. If a history table is being used to monitor those transactions within the accounting table that have been previously processed, the history table may be updated as shown in step 326.

Once the session table and request table have been created, they may be queried to determine CPU and I/O usage, as shown in step 328. For example, the session table may be queried to determine the historical trend of CPU and I/O usage among various users. Such a trend may be useful in forecasting or allocating data warehouse usage and resources. In another example the request table may be queried to determine which transactions represent large uses of data warehouse resources. For example, transactions that utilize more than a select level of CPU or I/O bandwidth may be identified. In another example, transactions with relatively high resource utilization may be identified. Such queries may be useful in determining which transactions may be improved or may be monitored or modified to further improve data warehouse performance or reduce CPU and I/O usage. A query may also be useful in identifying problem transactions that may be corrected to enhance data warehouse performance. Multiple Virtual Systems (MVS) data fields and an MVS system or the source identification fields and the query capturing software may be used to identify inefficient transactions. As shown in step 330, code associated with inefficient transaction requests may be manipulated to improve database performance. For example, the code may be manipulated to request a smaller set of data or, the transaction may be deleted.

FIG. 4 depicts an exemplary session table. The table may include, for example, such fields as user identification (ID), host ID, session ID, log-on date, log-on time, log-off date, log-off time, log-on performance group, log-off event, session duration, session CPU, session I/O, MVS data, Internet Protocol (IP) address, process ID, account name, load data, load time, among others. The user ID may identify a user. The host ID may identify a host. The session ID may provide a unique identification number to a session. The log-on date, log-on time, log-off date, and log-off time fields may provide temporal data associated with log-on and log-off events. However, other methods may be used to represent such data, such as using computer clock times that incorporate date and time. The log-on performance group field may be useful in ascertaining priority. The log-off event may include indications of whether the log-off was intentional or a timed-out event. The session duration field may present a total time or duration of session. The session CPU and session I/O fields may indicate CPU usage and input/output bandwidth usage. In addition to these fields, other fields may be included that incorporate statistics on the CPU and I/O or resource usage such as averages per transaction, maximum transaction usage, and minimum transaction usage.

Sessions may be manipulated or initiated from various sources. In some cases these sources may be a mainframe. As such, data associated with the mainframe transactions may be stored in the Multiple Virtual Systems (MVS) data fields. In one exemplary embodiment, the MVS data fields contain data that permits a user to look up a job on the MVS system to find more information about a transaction such as a query string. Other transactions may be manipulated through various network connections. As such, fields may be provided to record the source of these transactions such as where the source is identified by an IP address. In addition, software may be used to capture query strings from these other sources. The strings may then be identified using the source data. Further, the session table may associate other information with the session such as the process identification, the account names, and load dates and times. The load dates and times may indicate the date and time the entry was created or last updated.

FIG. 5 is an exemplary embodiment of a request table. A request table may include a host ID, a session ID, a user ID, log-on dates and times, request start date and request start times, request performance groups, access module processor (AMP) count, CPU and I/O data, parallelism data, ratios, and load dates and times. The host ID may identify the host. The session ID may provide a unique identification number for identifying the session. The user ID may identify the user. The log-on date and log-on time may be associated with the session and may be stored in various formats, such as computer clock times. Similarly the request start date and request start time identify the start date and time of the request and may be stored in other formats. The request performance group identifies the priority provided to the request. In multiprocessor and parallel systems, a request may be performed by more than one processor or more than one process. The request table may also include data associated with how many processes are assigned to the request. This data may be stored in the AMP count. In addition, statistical data associated with CPU usage and I/O usage may be stored in various fields including the CPU and I/O fields. For example, average, minimum, and maximum resource usage per AMP may be stored in a related field. Other statistics such as parallelism and CPU-to-I/O ratio may be used in characterizing the performance of a transaction. The load date and time may be useful in determining when an entry was inserted into the table or updated.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A database system comprising:
    a processor configured to receive transactions associated with a plurality of users, the transactions including session maintenance transactions and data requests;
    an event table to store an event log of the session maintenance transactions;
    an accounting table to store data associated with the data requests; and
    a session table derived from the event table and the accounting table, the session table to store resource usage data associated with a user session that accesses the database system, wherein the session table is accessible to determine a historical trend of data warehouse resource usage among the plurality of users.

2. The database system of claim 1, wherein the processor is configured to query the session table to determine a historical trend of input/output usage associated with a subset of the plurality of users.

3. The database system of claim 1, wherein the processor is configured to query the session table to determine a historical trend of processor usage associated with a subset of the plurality of users.

4. The database system of claim 1, wherein the historical trend of data warehouse resource usage is utilized to forecast data warehouse resource usage.

5. The database system of claim 1, wherein the historical trend of data warehouse resource usage is utilized to allocate data warehouse resources.

6. The database system of claim 2, wherein the session table is accessible to identify particular user sessions that utilize a selected level of computing resources.

7. The database system of claim 2, wherein the data warehouse resources include one of central processing unit (CPU) usage and input/output (I/0) bandwidth.

8. A method of tracking database system usage, the method comprising:

preparing a request table comprising one or more request table entries, wherein each request table entry includes resource usage data associated with a corresponding request transaction of a corresponding new session of the database system;

identifying a resource inefficient transaction request based on the resource usage data included in the request table; and modifying the identified resource inefficient transaction request to enhance a performance factor associated with the database system.

9. The method of claim 8, wherein modifying the identified resource inefficient transaction request comprises manipulating code associated with the identified resource inefficient transaction.

10. The method of claim 9, wherein the code associated with the identified resource inefficient transaction is manipulated to request a smaller set of data.

11. The method of claim 8, wherein modifying the identified resource inefficient transaction request comprises deleting a transaction associated with the identified resource inefficient transaction request.

12. The method of claim 8, wherein the resource usage data included in each request table entry is associated with at least one of a processor usage and an input/output usage of the database system.

* * * * *